US012572240B2

(12) United States Patent
Ji et al.

(10) Patent No.: US 12,572,240 B2
(45) Date of Patent: Mar. 10, 2026

(54) ELECTRONIC DEVICE AND DISPLAY METHOD

(71) Applicant: InnoLux Corporation, Miao-Li County (TW)

(72) Inventors: Wei-Kang Ji, Miao-Li County (TW); Chun-Li Chu, Miao-Li County (TW); Yen-Ching Pai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/978,335

(22) Filed: Dec. 12, 2024

(65) Prior Publication Data

US 2025/0224839 A1      Jul. 10, 2025

(30) Foreign Application Priority Data

Jan. 9, 2024     (CN) .......................... 202410032006.0

(51) Int. Cl.
*G06F 3/041* (2006.01)
*G02F 1/1333* (2006.01)
(Continued)

(52) U.S. Cl.
CPC ...... *G06F 3/04184* (2019.05); *G02F 1/13338* (2013.01); *G06F 3/0412* (2013.01); *G06F 3/04162* (2019.05); *G09G 3/3426* (2013.01); *G06F 3/0442* (2019.05); *G06F 2203/04107* (2013.01); *G09G 2300/0408* (2013.01);
(Continued)

(58) Field of Classification Search
CPC .............. G06F 3/0416; G06F 3/04166; G06F 3/0418–04186; G09G 3/32–3291; G09G 3/34–3426; G09G 2310/08
See application file for complete search history.

(56) References Cited

U.S. PATENT DOCUMENTS 10,678,356 B2 * 6/2020 Kim ..................... G06F 3/04184
10,818,237 B2 * 10/2020 Noh ..................... G09G 3/3275
(Continued)

FOREIGN PATENT DOCUMENTS

| CN | 102096531 A | 6/2011 |
|----|-------------|--------|
| CN | 106057156 A | 10/2016 |

*Primary Examiner* — Patrick F Marinelli
(74) *Attorney, Agent, or Firm* — McClure, Qualey & Rodack, LLP

(57) ABSTRACT

An electronic device and a display method are provided. The electronic device includes a touchscreen, a processing unit, a light-emitting element, and a light source driving unit. The touchscreen displays a frame within a frame period that includes an active period and a blanking period. The active period includes a plurality of display periods and touch periods. The processing unit is electrically connected to the touchscreen and provides a plurality of trigger signals during the active period and an excitation signal during the blanking period. The light-emitting element overlaps the touchscreen. The light source driving unit is electrically connected to the light-emitting element and the processing unit. The light source driving unit causes the light-emitting element to emit light according to the plurality of trigger signals during the active period and causes the light-emitting element to emit light according to the excitation signal during the blanking period.

15 Claims, 10 Drawing Sheets

(51) Int. Cl.
　　*G06F 3/044*　　　　(2006.01)
　　*G09G 3/34*　　　　(2006.01)

(52) U.S. Cl.
　　CPC ... *G09G 2310/061* (2013.01); *G09G 2310/08*
　　　　(2013.01); *G09G 2320/0233* (2013.01); *G09G*
　　　　　　*2320/0247* (2013.01); *G09G 2320/0686*
　　　　　　　(2013.01); *G09G 2354/00* (2013.01)

(56)　　　　　　References Cited

U.S. PATENT DOCUMENTS

| | | | |
|---|---|---|---|
| 11,551,469 B2 * | 1/2023 | Lin ........................ | G06F 3/0443 |
| 2014/0361277 A1 * | 12/2014 | Lee ........................ | H10K 59/40 |
| | | | 257/40 |
| 2018/0033379 A1 | 2/2018 | Li | |
| 2018/0314385 A1 * | 11/2018 | Gupta .................. | G09G 3/3208 |
| 2019/0197959 A1 * | 6/2019 | Noh ..................... | G09G 3/3233 |
| 2020/0183563 A1 * | 6/2020 | Weng .................. | G06F 3/04166 |
| 2021/0019035 A1 * | 1/2021 | Yoo ........................ | G06F 3/0443 |
| 2022/0121341 A1 * | 4/2022 | Wang ............... | G02F 1/133601 |
| 2023/0206827 A1 * | 6/2023 | Kim ........................ | G11C 19/28 |
| 2024/0256061 A1 * | 8/2024 | Kim ..................... | G06F 3/0443 |

* cited by examiner

ELECTRONIC DEVICE AND DISPLAY METHOD

CROSS REFERENCE TO RELATED APPLICATIONS

This Application claims priority of China Patent Application No. 202410032006.0, filed on Jan. 9, 2024, the entirety of which is incorporated by reference herein.

BACKGROUND OF THE INVENTION

Field of the Invention

The present disclosure relates to electronic devices, and, in particular, to a light-emitting element that emits light during a blanking period.

Description of the Related Art

In the structure of in-cell touch panels, a time-sharing architecture is usually used to avoid interference between the scanning signals of the backlight and the touch signals. However, the time-sharing architecture may sacrifice the brightness of the electronic device. For example, during the blanking period of each frame, since there is no scanning signal that triggers the backlight, the screen may flicker or the overall brightness may decrease. Although existing electronic devices have largely met their intended purposes, they do not meet requirements in all respects. Therefore, there are still some problems that need to be overcome regarding the electronic devices.

BRIEF SUMMARY OF THE INVENTION

In some embodiments, an electronic device is provided. The electronic device includes a touchscreen, a processing unit, a light-emitting element, and a light source driving unit. The touchscreen is configured to display a frame within a frame period, wherein the frame period includes an active period and a blanking period, and the active period includes a plurality of display periods and a plurality of touch periods. The processing unit is electrically connected to the touchscreen, wherein the processing unit is configured to provide a plurality of trigger signals during the active period and to provide an excitation signal during the blanking period. The light-emitting element overlaps the touchscreen. The light source driving unit is electrically connected to the light-emitting element and the processing unit, wherein the light source driving unit is configured to cause the light-emitting element to emit light according to the plurality of trigger signals during the active period, and to cause the light-emitting element to emit light according to the excitation signal during the blanking period.

In some embodiments, a display method is provided. The display method includes the following steps. An electronic device is provided, wherein the electronic device comprises a touchscreen and a light-emitting element. The touchscreen is caused to display a frame within a frame period, wherein the frame period comprises an active period and a blanking period, and the active period comprises a plurality of display periods and a plurality of touch periods. A plurality of trigger signals are provided and the light-emitting element is caused to emit light according to the plurality of trigger signals during the active period. An excitation signal is provided and the light-emitting element is caused to emit light according to the excitation signal during the blanking period.

The electronic device of the present disclosure can be applied in a variety of displays. In order to make the features and advantages of the present disclosure more comprehensible, various embodiments are specially cited hereinafter, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
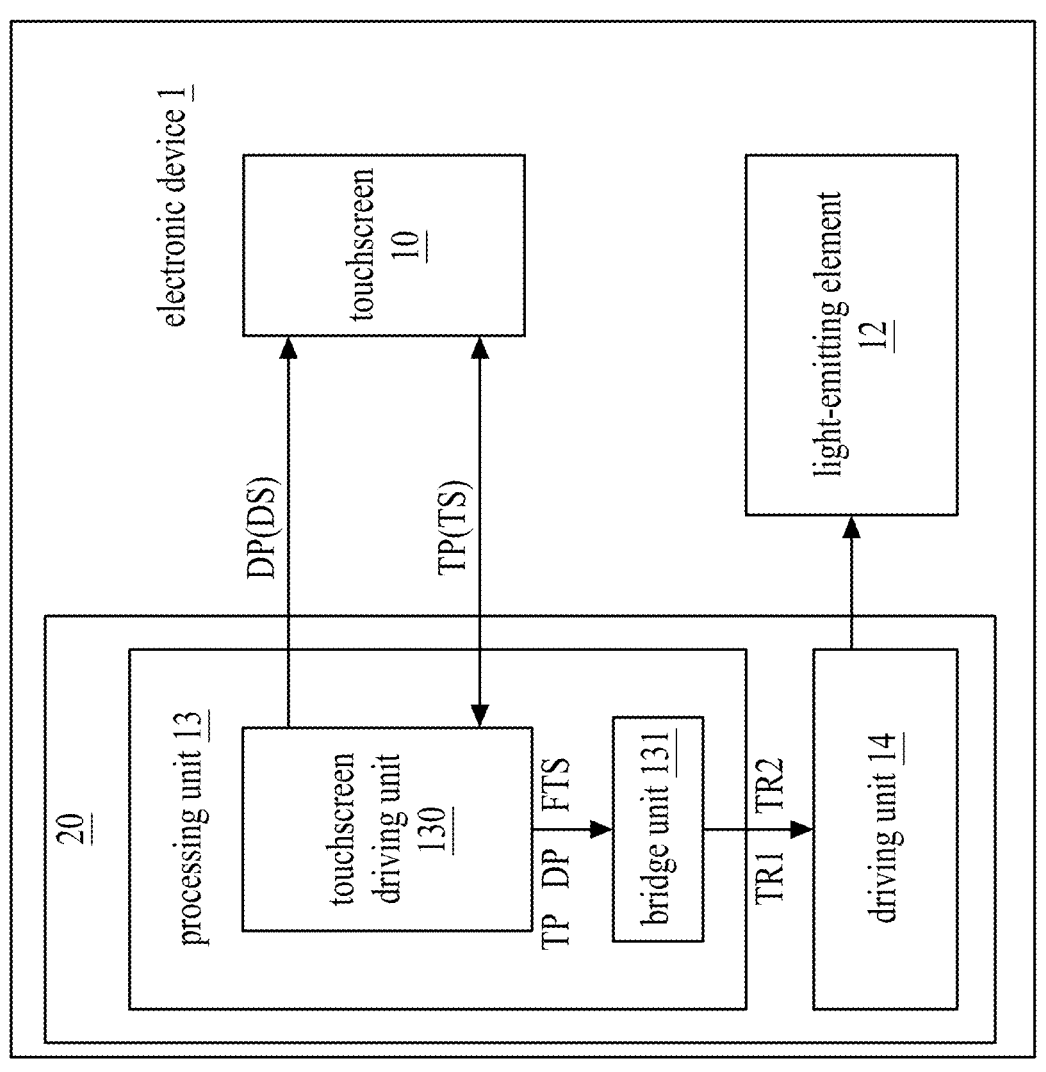
FIG. 1 is a block diagram of the electronic device according to some embodiments of the present disclosure.

In order to make the above objects, features, and benefits of some embodiments of the present disclosure more obvious and understandable, detailed descriptions are given hereinafter with reference to the drawings.

It should be understood that the terms "include" and "comprise" used in the present disclosure are used to indicate the existence of specific technical features, numerical values, method steps, operation processes, elements, and/or components, but do not exclude that more technical features, numerical values, method steps, operation processes, elements, components, or any combination thereof may be added.

The terms such as "first", "second", "third", "fourth", and the like are used to modify elements and are not used to indicate the priority or precedence relationship therebetween but are used to clearly distinguish elements with the same name.

It should be noted that, in the following embodiments, features in several different embodiments may be replaced, recombined, and bonded to complete other embodiments without departing from the spirit of the present disclosure. The features of the various embodiments can be used in any combination as long as they do not violate the spirit of the present disclosure or conflict with each other.

In the present disclosure, the electronic device may include a display device, a back light device, an antenna device, a sensing device, or a titling device, but the present disclosure is not limited thereto. The electronic device may be a foldable or flexible electronic device. The display device may be a non-self-luminous display device or a self-luminous display device. The antenna device may be a liquid-crystal antenna device or a non-liquid-crystal antenna device. The sensing device may be a sensing device for sensing capacitance, light, heat, or ultrasonic waves, but the present disclosure is not limited thereto. The electronic elements may include passive elements and active elements, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs), or quantum dot light-emitting diodes (quantum dot LED), but the present disclosure is not limited thereto. The titling device may be, for example, a display titling device or an antenna titling device, but the present disclosure is not limited thereto. It should be noted that, the electronic device can be any arrangement and combination of the foregoing, but the present disclosure is not limited thereto. The content of the present disclosure will be described hereinafter with an electronic device as a display device or a titling device, but the present disclosure is not limited thereto.

In addition, the shape of the electronic device may be a rectangle, a circle, a polygon, a shape with curved edges, or other suitable shapes. The electronic device may have peripheral systems such as a processing system, a driving system, a control system, a light source system, and a shelf system to support the electronic device.

In some embodiments, additional features may be added to the electronic device of the present disclosure. In some embodiments, some features of the electronic device disclosed herein may be replaced or omitted. In some embodiments, additional operation steps may be provided before, during, and after the electronic device. In some embodiments, some of the described operation steps may be replaced or omitted, and the order of some of the described operation steps may be interchangeable. Furthermore, it should be understood that some of the described operation steps may be replaced or deleted for other embodiments of the method. Moreover, in the present disclosure, the number and size of each element in the drawings are only for illustration, and are not used to limit the scope of the present disclosure.

In some previous electronic devices, each frame (or display screen) includes an active period and a blanking period. During the active period, the touchscreen activates the display function and touch function in turn to avoid interference between the signals used to control these functions. In this case, the backlight is activated with the display elements in the touchscreen to provide illumination. However, during the blanking period, the backlight is also inactivated since neither the display element nor the touch element in the touchscreen is activated. When the blanking period is too long, the human eye may detect flickering caused by the inactivity of the backlight. Therefore, the present disclosure provides an electronic device that triggers the operation of the backlight by providing a dummy signal during the blanking period to avoid the above problems.

FIGS. 1 to 4 respectively are a block diagram of the electronic device, a schematic diagram of the electronic device, a schematic diagram of the light-emitting element, and a timing diagram of the temporal relationship between various units and signals according to some embodiments of the present disclosure. As shown in FIG. 1, the electronic device 1 includes a touchscreen 10, a light-emitting element 12, a processing unit 13, and a light source driving unit 14, but the present disclosure is not limited thereto.

Figure 4:
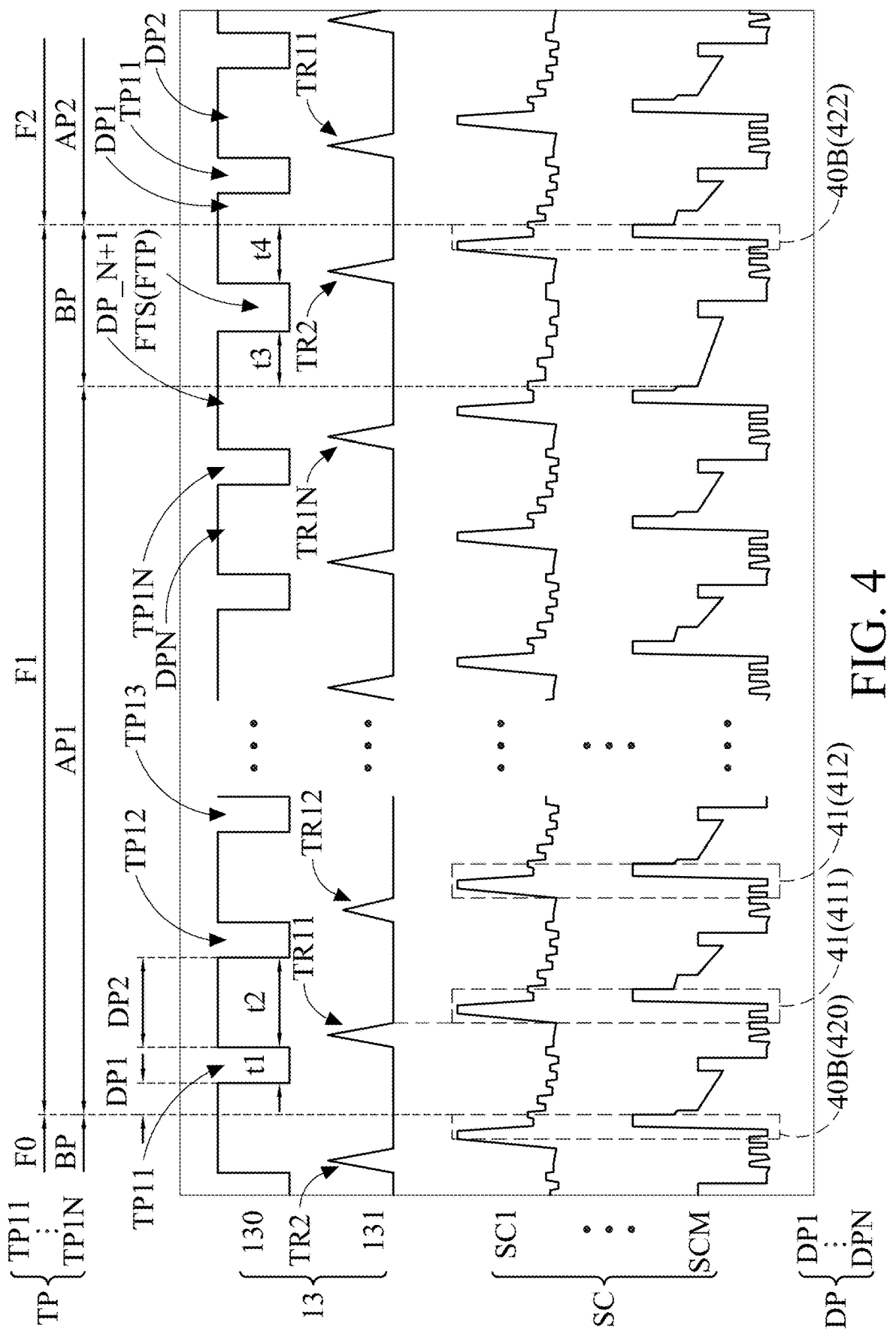
FIG. 4 is a timing diagram of the temporal relationship between various units and signals according to some embodiments of the present disclosure.

As shown in FIGS. 1 and 4, the touchscreen 10 is configured to display a frame during the frame period F1, wherein the frame period F1 includes an active period AP1 and a blanking period BP. The active period AP1 is previous to the blanking period BP. Specifically, the active period AP1 includes a plurality of display periods DP (e.g., display periods DP1, DP2 . . . ) and a plurality of touch periods TP (e.g., touch periods TP11, TP12 . . . ) arranged alternately, and the display periods DP and the touch periods TP do not overlap each other. Specifically, during the active period AP1, elements such as liquid crystal cells in the touchscreen 10 are activated according to the display signal. In contrast, during the blanking period BP, elements such as liquid crystal cells in the touchscreen 10 are inactivated.

Similarly, the touchscreen 10 is configured to display another frame in another frame period F2, wherein the frame period F2 includes an active period AP12 and a blanking period BP. Similarly, the active period AP12 also includes a plurality of display periods DP (e.g., the display periods DP1, DP2 . . . ) and a plurality of touch periods TP (e.g., the touch periods TP11, TP12 . . . ) arranged alternately, and the display periods DP and the touch periods TP do not overlap each other. In other words, different frame periods (e.g., the frame period F1 and frame period F2) may have similar or identical actions. Of course, the present disclosure is not limited thereto. For the sake of simplicity, the following uses the frame period F1 as an example to describe the details of the operation of each element in detail. In FIG. 4, three consecutive frame periods F0, F1, and F2 are shown in sequence. For convenience of explanation, only the complete frame period F1 is shown in the figure, and only part of the frame period F0 and part of the frame period F2 are shown.

Figure 10:
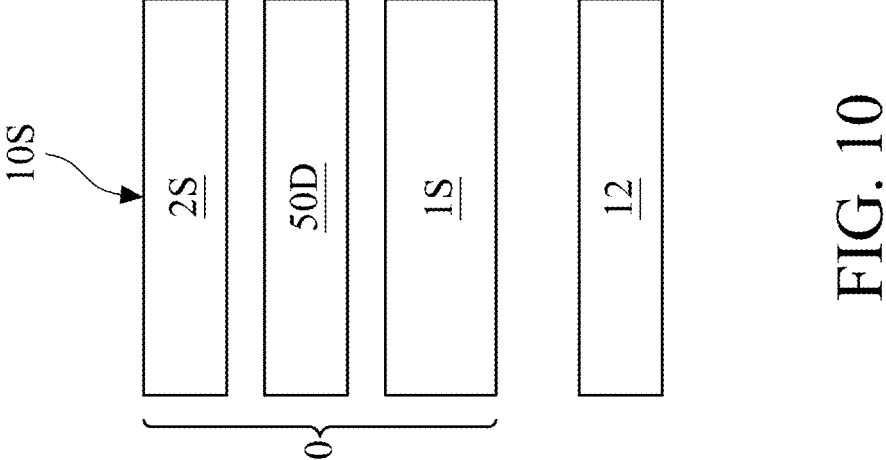
FIG. 10 is a cross-sectional view of the touchscreen according to some embodiments of the present disclosure.
Figure 10:
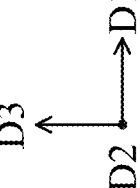

As shown in FIG. 1, the processing unit 13 is electrically connected to the touchscreen 10. The processing unit 13 is configured to provide a plurality of trigger signals TR1 (e.g., the trigger signals TR11, TR12 . . . ) during the active period AP1 and to provide an excitation signal TR2 during the blanking period BP. The light-emitting element 12 overlaps the touchscreen 10, as shown in FIG. 10. In this way, according to some embodiments, the light-emitting element 12 may be used as a direct backlight of the touchscreen 10. The light source driving unit 14 is electrically connected to the light-emitting element 12 and the processing unit 13. The light source driving unit 14 is configured to cause the light-emitting element 12 to emit light during the active period AP1 according to the trigger signal TR1 and cause the light-emitting element 12 to emit light during the blanking period BP according to the excitation signal TR2.

FIG. 10 is a cross-sectional view of the touchscreen according to some embodiments of the present disclosure. As shown in the figure, the touchscreen 10 may partially or completely overlap the light-emitting element 12 in the direction D3. The touchscreen 10 may have a surface 10S formed by the direction D1 and the direction D2, and the direction D3 may be a normal direction of the surface 10S of the touchscreen 10. The direction D1, the direction D2, and the direction D3 may be different, for example, they may be perpendicular to each other. In some embodiments, the touchscreen 10 may include a first substrate 1S, a second substrate 2S, and a display layer 50D. The display layer 50D is disposed between the first substrate 1S and the second substrate 2S. In some embodiments, the first substrate 1S and the second substrate 2S may individually be a flexible substrate or a rigid substrate. For example, the first substrate 1S and the second substrate 2S may individually include glass, plastic, quartz, or a combination thereof. In some embodiments, the display layer 50D may include film layers such as a liquid crystal layer, a pixel layer, an electrode layer, and a circuit layer, but the present disclosure is not limited thereto. According to some embodiments, the display layer 50D may include a plurality of pixel units P, a data driving unit 10D, a gate driving unit 10G, a data line DL, a gate line GL, an electrode TE, or a combination thereof described in FIG. 2 below, but the present disclosure is not limited thereto.

Figure 5:
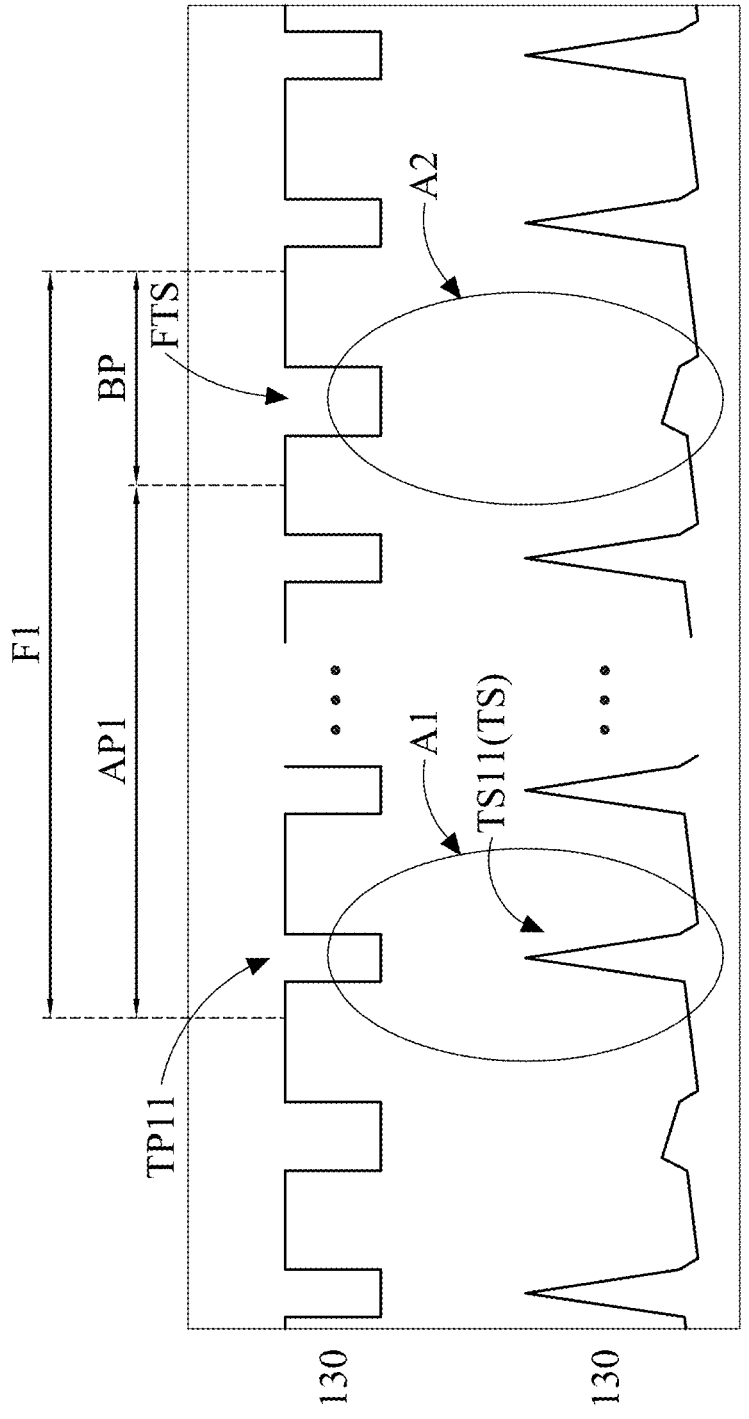
FIG. 5 is a schematic diagram of signals between the touch panel sensor chip and the touch element according to some embodiments of the present disclosure.

As shown in FIG. 1, according to some embodiments, the processing unit 13 may include a touchscreen driving unit 130 and a bridge unit 131. The bridge unit 131 may bridge (e.g., electrically connect) the touchscreen driving unit 130 and the light source driving unit 14. The touchscreen driving unit 130 is configured to provide a touch signal TS in at least one of the plurality of touch periods TP. According to some embodiments, during each touch period TP, the touchscreen driving unit 130 may provide one touch signal TS. The touch signal TS may be provided to the touchscreen 10. During each touch periods TP, the touchscreen driving unit 130 may provide corresponding touch signals TS to the touchscreen 10. For example, as shown in FIGS. 4 and 5, during the touch period TP11, the touchscreen driving unit 130 may provide the touch signal TS11, as shown in FIG. 5. During the touch period TP12, the touchscreen driving unit 130 may provide corresponding touch signals. According to some embodiments, the processing unit 13 and the light source driving unit 14 may be disposed on the same circuit board component 20, but the present disclosure is not limited thereto.

As shown in FIGS. 1 and 4, during the active period AP1, the touchscreen driving unit 130 is configured to send touch information of the touch period TP to the bridge unit 131, and the bridge unit 131 is configured to provide the trigger signal TR1 according to the touch information. The bridge unit 131 provides the trigger signal TR1 to the light source driving unit 14 according to the touch information during the active period AP1. The light source driving unit 14 is configured to cause the light-emitting element 12 to emit light according to the trigger signal TR1 during the active period AP1. As shown in FIG. 4, in some embodiments, the touch period TP includes a first touch period TP11, a second touch period TP12 . . . a N-th touch period TP1N, and the trigger signal TR1 includes a first trigger signal TR11, a second trigger signal TR11 . . . a N-th trigger signal TR1N. N may be an integer from 2 to 50, such as an integer from 5 to 30, or such as an integer from 10 to 25, but the present disclosure is not limited thereto.

As shown in FIG. 4, taking the first touch period TP11 in the touch period TP as an example, after receiving the touch information of the first touch period TP11, the bridge unit 131 may provide the first trigger signal TR11 according to the touch information. The period of the first trigger signal TR11 follows the first touch period TP11. According to some embodiments, the period of the first trigger signal TR11 is adjacent to the first touch period TP11. According to some embodiments, the end time point of the first touch period TP11 may be the start time point of the period of the first trigger signal TR11. According to some embodiments, the end time point of the first touch period TP11 may be the start time point of the period of the first trigger signal TR11. According to some embodiments, after the period of the first trigger signal TR11 ends, a time may elapse before the first trigger signal TR11 is started. According to some embodiments, the period of the first trigger signal TR11 is adjacent to the first touch period TP11, which may mean that there is no other signal between the touch signal TS11 and the first trigger signal TR11 during the first touch period TP11.

As shown in FIGS. 1 and 4, during the blanking period BP, the touchscreen driving unit 130 may provide a dummy signal FTS, and the bridge unit 131 is configured to provide an excitation signal TR2 according to the touch information in the dummy signal FTS. In other words, after receiving the dummy signal FTS, the bridge unit 131 may provide the excitation signal TR2 according to the dummy signal FTS. Specifically, the period of the excitation signal TR2 follows the dummy period FTP of the dummy signal FTS. According to some embodiments, the period of the excitation signal TR2 is adjacent to the period of the dummy signal FTS. According to some embodiments, the end time point of the period of the dummy signal FTS may be the start time point of the period of the excitation signal TR2. Continuing the above process, the light source driving unit 14 may cause the light-emitting element 12 to emit light during the blanking period BP according to the excitation signal TR2. It should be noticed that the above dummy signal FTS is not used to actuate any touch electrodes in the touchscreen 10 but is used to actuate the bridge unit 131 (which is further explained below). According to some embodiments, after the period of the dummy signal FTS ends, a time may elapse before the signal TR2 is started to be excited. According to some embodiments, the period of the excitation signal TR2 is adjacent to the period of the dummy signal FTS, which may mean that there is no other signal between the dummy signal FTS and the excitation signal TR2 during the blanking period BP.

The light emission of the light-emitting element 12 is described below. When the light source driving unit 14 receives any one of the trigger signal TR1 and the excitation signal TR2, the light source driving unit 14 may provide a scanning signal to cause the light-emitting element 12 to emit light. For example, as shown in FIG. 4, during the active period AP1, the light source driving unit 14 is configured to cause the light-emitting element 12 to perform the first light-emitting scan 41 (in order to easily distinguish it from other first light-emitting scans, it is represented by the first light-emitting scan 411 in the present disclosure and the figures) following the period of the first trigger signal TR11 in the trigger signals TR1. In some embodiments, the period of the first light-emitting scan 411 is between the period of the first trigger signal TR11 and the second touch period TP12. Similarly, during the active period AP1, the bridge unit 131 may provide the second trigger signal TR12. After receiving the second trigger signal TR12, the light source driving unit 14 may cause the light-emitting element 12 to perform another first light-emitting scan 41 (in order to easily distinguish it from other first light-emitting scans, it is represented by the first light-emitting scan 412 in the present disclosure and the figures). In some embodiments, the period of the first light-emitting scan 412 is between the period of the second trigger signal TR12 and the third touch period TP13. During the blanking period BP, the light source driving unit 14 is configured to cause the light-emitting element 12 to perform the second light-emitting scan 40B (422) following the excitation signal TR2. FIG. 4 also shows the excitation signal TR2 and the second light-emitting scan 40B (420) during the blanking period BP of the previous frame period F0, and the description is omitted.

Figure 3:
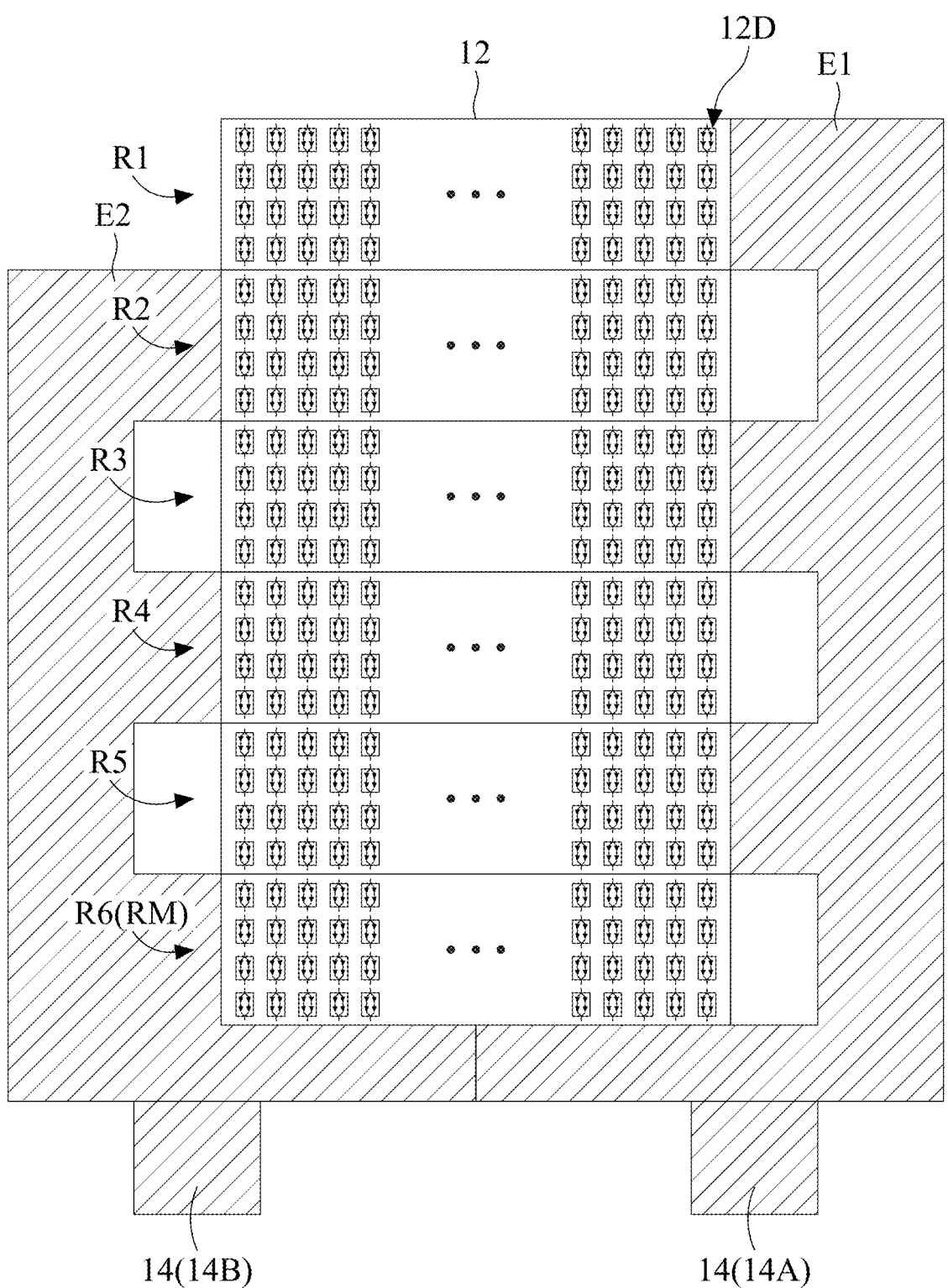
FIG. 3 is a schematic diagram of the light-emitting element according to some embodiments of the present disclosure.

As shown in FIG. 3, according to some embodiments, the light-emitting element 12 may include a plurality of light-emitting units 12D, which may be arranged in a matrix. For example, the plurality of light-emitting units 12D may be divided into M groups (M rows) of light-emitting units. M may be an integer between 2 and 128, such as between 2 and 100, or such as between 2 and 50, or such as between 2 and 15.

As shown in FIG. 3, M=6 is taken as an example for illustration, and the example is not intended to limit the present disclosure. The plurality of light-emitting units 12D include 6 rows, such as the first row R1, the second row R2 . . . and the sixth row R6. The light source driving unit 14 may include a first light source driving unit 14A and a second light source driving unit 14B. According to some embodiments, the light-emitting units 12D in odd rows (such as the first row R1, the third row R3, and the fifth row R5) may be electrically connected to the wire E1 on the right side, and these light-emitting units 12D may further be connected to the first light source driving unit 14A through the wire E1. The light-emitting units 12D in even rows (such as the second row R2, the fourth row R4, and the sixth row R6) may be electrically connected to the wire E2 on the left side, and these light-emitting units 12D may be further connected to the light source driving unit 14B through the wire E2. According to some embodiments, the first light source driving unit 14A and the second light source driving unit 14B may be flexible printed circuit boards (FPC), but the present disclosure is not limited thereto.

In some embodiments, the light-emitting units 12D of each row (each group) may be connected to the same positive electrode through the same scanning signal line (not shown), but each is connected to a different negative electrode through a different channel signal line (not shown), but the present disclosure is not limited thereto. Alternatively, in some embodiments, the light-emitting units of each row (each group) may be connected to the same negative electrode, but each be connected to a different positive electrode. Through the scanning of the scanning signal lines and the data input by the channel signal lines, the brightness and dimming information of each light-emitting unit 12D may be controlled, and the brightness adjustment in zones of the light-emitting element 12 may be achieved.

As shown in FIG. 3, taking M=6 as an example, the light source driving unit 14 may send M (=6) scanning signals to sequentially activate the above-mentioned 6 groups of light-emitting units 12D. As shown in FIG. 4, the M scanning signals are the first scanning signal SC1 to the M-th scanning signal SCM. In order of time, the first scanning signal SC1 may scan the light-emitting units of the first row, the second scanning signal SC2 may scan the light-emitting units of the second row . . . , and the M-th scanning signal SCM may scan the light-emitting units 12D of the M-th row, thus completing the scanning of all light-emitting units 12D. The light-emitting units 12D in the first to M-th rows may emit light sequentially in time, and the light-emitting element 12 may be referred to as a scan-type light-emitting element.

As shown in FIG. 1, the light-emitting element 12 is used to provide a backlight source to the touchscreen 10. As shown in FIG. 3, in some embodiments, each light-emitting unit 12D in the light-emitting element 12 may include at least one light-emitting diode, such as four light-emitting diodes. For example, one light-emitting unit 12D may include two light-emitting diodes connected in series and two light-emitting diodes connected in parallel. The light-emitting unit 12D may be designed according to requirements and is not limited thereto. For example, the design of the light-emitting unit 12D may be adjusted according to the maximum voltage of the matched light source driving unit 14. The light-emitting diodes may include organic light-emitting diodes (OLEDs), mini light-emitting diodes (mini LEDs), micro light-emitting diodes (micro LEDs), quantum dot light-emitting diodes (quantum dot LED), or a combination thereof, or other suitable diodes, but the present disclosure is not limited thereto.

Figure 2:
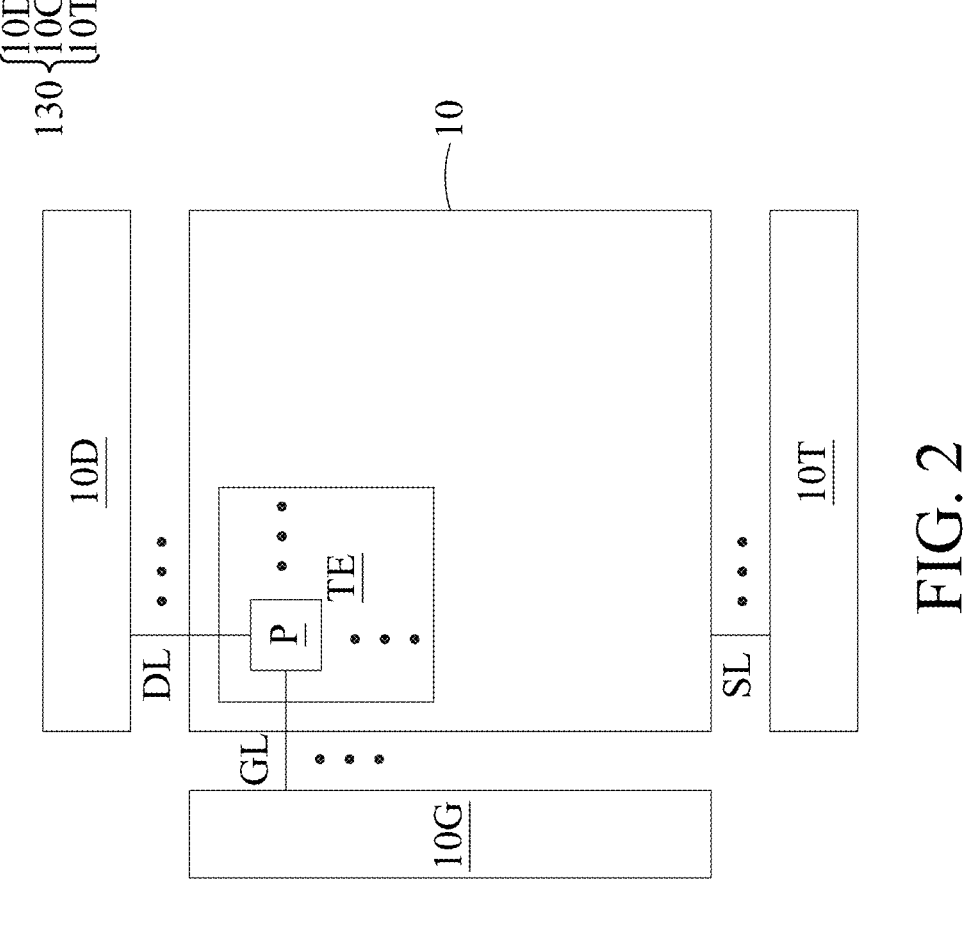
FIG. 2 is a schematic diagram of the electronic device according to some embodiments of the present disclosure.

In some embodiments, as shown in FIG. 2, the electronic device includes a touchscreen 10, a data driving unit 10D, a gate driving unit 10G, and a touch driving unit 10T. The touchscreen 10 includes a plurality of pixel units P arranged in a matrix, a plurality of gate lines GL, a plurality of data lines DL, and a plurality of touch lines SL. For example, the plurality of pixel units P may be or may include display units for displaying three primary color signals such as red (R), green (G), and blue (B), but the present disclosure is not limited thereto. For example, the plurality of pixel units P may include a plurality of pixel electrodes. The data driving unit 10D and the gate driving unit 10G are each electrically connected to the plurality of pixel units P in the touchscreen 10. The pixel units P are electrically connected to the data driving unit 10D through respective data lines DL and are electrically connected to the gate driving unit 10G through respective gate lines GL. The gate driving unit 10G is used to turn on or turn off the pixel units P in each row according to a synchronization signal (e.g., a vertical synchronization signal (Vsync)). For convenience of explanation, FIG. 2 only shows one data line DL and one gate line GL. For example, a whole row of pixel units P may be turned on or turned off according to the synchronization signal through the gate driving unit 10G, and a signal may be input to the display area through the data driving unit 10D, so that the display area displays an image. As shown in FIG. 2, the gate driving unit 10G scans the pixel units P in the first row through the first gate line (not shown), scans the pixel units P in the second row through the second gate line (not shown), . . . , and scans the pixel units P in the last row through the last gate line (not shown). The period in which the gate driving unit 10G scans the pixel units P is within the display period DP of the active period AP1. During the touch period TP, the gate driving unit 10G does not scan pixel units P.

As shown in FIG. 2, the touchscreen 10 may be an in-cell touchscreen, that is, the electrode TE is embedded in the touchscreen 10. In detail, the common electrode that provides a common voltage in the touchscreen 10 may be divided into a plurality of electrodes TE. The electrodes TE are electrically connected to the touch driving unit 10T through corresponding touch lines SL. For convenience of explanation, FIG. 2 only shows one electrode TE and one touch line SL. During the display period DP as shown in FIG. 4, the electrode TE may be used as a common electrode. During the touch period TP, the electrode TE may be used as a touch electrode.

As shown in FIGS. 1 and 2, according to some embodiments, the data driving unit 10D, the gate driving unit 10G, and the touch driving unit 10T may be integrated into the touchscreen driving unit 130. For example, they are integrated into a driving chip, such as a touch with display driver integrated chip (TDDI). During the display period DP as shown in FIG. 4, the touchscreen driving unit 130 may provide the display signal DS to the touchscreen 10. During the touch period TP, the touchscreen driving unit 130 may provide the touch signal TS to the electrode TE in the touchscreen 10. According to some embodiments, the data driving unit 10D and the touch driving unit 10T may be integrated into the touchscreen driving unit 130. The gate driving unit 10G may be integrated into the touchscreen 10 and to be a gate on panel (GOP) unit. For example, although not shown in the figure, the gate driving unit 10G and the electrode TE may be provided on the same substrate (not shown).

In the following, the practical application manner of the present disclosure will be described through timing diagrams. It should be noted that FIGS. 1 to 3 are used to illustrate the operating principle of the electronic device 1 and are not intended to limit the position, number, and size of each element.

As shown in FIG. 4, during the active period AP1 of the frame period F1, the signal sent by the touchscreen driving unit 130 of the processing unit 13 may be switched from a high potential to a low potential. In some embodiments, the low-potential state may be referred to as a touch slot period, and the high-potential state may be referred to as a display period, but the present disclosure is not limited thereto. When switching to low potential, the touchscreen driving unit 130 of the processing unit 13 provides the touch signal TS to the touchscreen 10 during the touch period TP, so that the touchscreen 10 performs touch sensing. According to some embodiments, although not shown in the figure, during the active period AP1 of the frame period F1, the signal sent by the touchscreen driving unit 130 may be switched from a low potential to a high potential. That is, the high potential state may be the touch slot period, and the low potential state may be the display period.

During the display period DP of the active period AP1 (e.g., the display periods DP1, DP2 . . . DPN, and DP_N+1), the signal sent by the touchscreen driving unit 130 may be maintained at a high potential. The touchscreen driving unit 130 of the processing unit 13 provides the display signal DS to the touchscreen 10 so that the touchscreen 10 displays frames. In some embodiments, the display signal DS may include a synchronization signal, such as a horizontal synchronization signal, but the present disclosure is not limited thereto. In some embodiments, in addition to the initial display period DP1 and the last display period DP_N+1, the time length for which the processing unit 13 provides the display signal DS to the touchscreen 10 may be equal to the time length t2 of the display period DP (e.g., DP2 . . . DPN).

According to some embodiments, as shown in FIGS. 1 and 4, following the processing unit 13 provides the touch signal TS to the touchscreen 10, the bridge unit 131 of the processing unit 13 provides the trigger signal TR1 to the light source driving unit 14. Specifically, following the touch period TP of the active period AP1 and during the display period DP of the active period AP1, the bridge unit 131 generates the trigger signal TR1 (e.g., the first trigger signal TR11) according to the touch information of the touch period TP. Following the bridge unit 131 of the processing unit 13 provides the trigger signal TR1 to the light source driving unit 14, the light source driving unit 14 provides the first scanning signal SC1 to the light-emitting element 12 according to the trigger signal TR1. Then, following the light source driving unit 14 provides the first scanning signal SC1, the light source driving unit 14 sequentially provides the second scanning signal (not shown) to the M-th scanning signal SCM to the light-emitting element 12, so that M groups of light-emitting diodes of the light-emitting element 12 may emit light sequentially. In some embodiments, the time length for which the light source driving unit 14 provides the first to M-th scanning signals SC1 to SCM to the light-emitting element 12 is equal to or less than the time length t2 of the display period DP. Each group of light-emitting units 12D of the light-emitting element 12 may be sequentially lit in a single display period DP (e.g., DP1, DP2 . . . DPN, DP_N+1) to completely provide a light source to the entire touchscreen 10. In other words, each group of light-emitting units 12D is lit once in a single display period DP.

As mentioned above, during the entire active period AP1, the touchscreen driving unit 130 repeatedly provides the touch signal TS during the touch period TP and the display signal DS during the display period DP until the end of the active period AP1. It should be noticed that during the touch period TP of the active period AP1, the pixel units P (such as pixel electrodes) and the light-emitting element 12 in the touchscreen 10 are not activated, and the electrode TE in the touchscreen 10 is activated according to the touch signal TS provided by the touchscreen driving unit 130. On the contrary, during the display period DP of the active period AP1, the pixel units P (such as pixel electrodes) in the touchscreen 10 are activated according to the display signal DS provided by the touchscreen driving unit 130, the light-emitting element 12 is activated according to the scanning signal SC provided by the driving unit 14, but the electrode TE is not activated. In this way, signals between these components may be prevented from interfering with each other.

In some embodiments, the number of display periods DP included in one active period AP1 is not limited. For example, one active period AP1 may include 3 to 50 display periods DP, such as 5 to 25 display periods DP, or such as 10 to 25 display periods. The number of touch periods TP included in the active period AP1 may be one less than the number of display periods DP. For example, as shown in FIG. 4, one active period AP1 includes N touch periods (TP11, TP12 . . . and TP1N) and N+1 display periods (DP1, DP2 . . . DPN, and DP_N+1). In other words, the active period AP1 may start with a display period (e.g., DP1) and end with a display period (e.g., DP_N+1), but the present disclosure is not limited thereto. According to some embodiments, the active period AP1 may start with the touch period and end with the touch period, but the present disclosure is not limited thereto.

In some embodiments, during the active period AP1, the individual touch period TP may be greater than, less than, or equal to the length of the individual display period DP, but the present disclosure is not limited thereto. For example, as shown in FIG. 4, the time length t1 of the touch period TP11 may be greater than, less than, or equal to the time length t2 of the display period DP2.

As shown in FIG. 4, during the frame period F1, different from the active period AP1, the touchscreen driving unit 130 of the processing unit 13 does not provide the display signal DS to the touchscreen 10 during the blanking period BP. At this time, the processing unit 13 may transmit other types of signals, such as synchronization frame information, audio information, announcement frame information, etc., but the present disclosure is not limited thereto.

As shown in FIG. 4, during the frame period F1 and during the dummy period FTP of the blanking period BP, the signal sent by the touchscreen driving unit 130 of the processing unit 13 may be switched from a high potential to a low potential. However, different from the active period AP1, during the blanking period BP, the touchscreen driving unit 130 of the processing unit 13 does not provide the touch signal TS to the electrode TE in the touchscreen 10 but provides a dummy signal FTS. This dummy signal FTS is not used to drive the electrode TE but is used to cause the bridge unit 131 of the processing unit 13 to generate the excitation signal TR2.

Figure 6A:
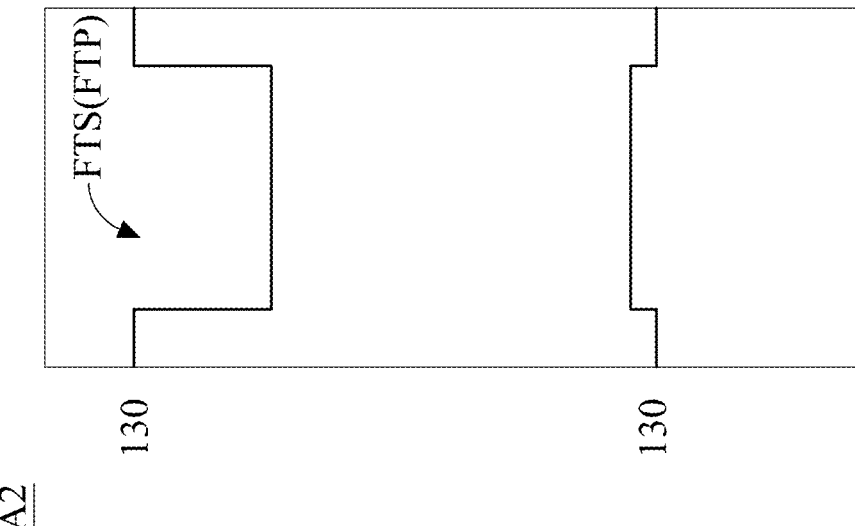
FIG. 6A is an enlarged schematic diagram of area A1 in FIG. 5.
Figure 6B:
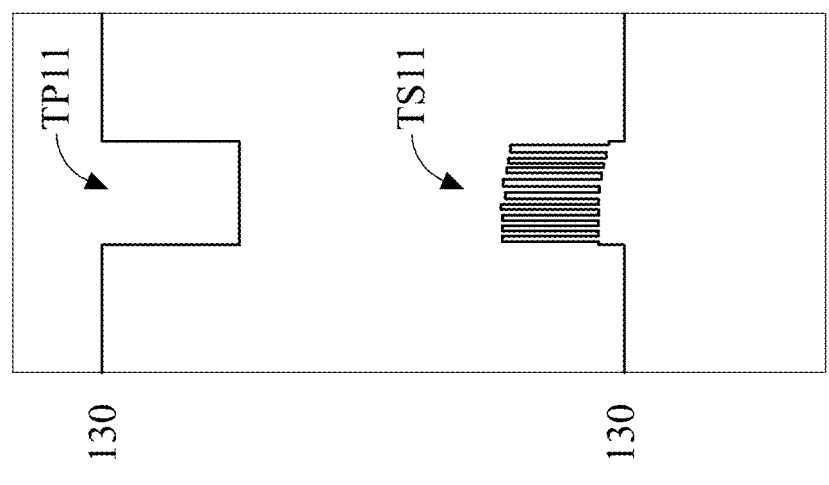
FIG. 6B is an enlarged schematic diagram of area A2 in FIG. 5.

FIGS. 5, 6A, and 6B are schematic diagrams of signals between the touchscreen driving unit 130 and the touchscreen 10. FIG. 6A is an enlarged schematic diagram of the area A1 in FIG. 5, and FIG. 6B is an enlarged schematic diagram of the area A2 in FIG. 5. During the touch period TP of the active period AP1, the touchscreen driving unit 130 may provide the touch signal TS (e.g., the touch signal TS11) to the electrode TE in the touchscreen 10. However, as shown in FIGS. 5, 6A, and 6B, the touchscreen driving unit 130 changes to provide the dummy signal FTS during the blanking period BP. During the blanking period BP, the touchscreen driving unit 130 does not provide any touch signal TS to the electrode TE in the touchscreen 10. In FIG. 5, the touch period TP11 may be a touch period generated by the touchscreen driving unit 130 or may be a touch period measured on a pin of the touchscreen driving unit 130. The touch signal TS11 may be a signal provided by the touchscreen driving unit 130 to the touchscreen 10 and may be a signal measured on the electrode TE in the touchscreen 10.

According to the above, the present disclosure additionally provides the dummy signal FTS during the blanking period BP, so that the bridge unit 131 generates the excitation signal TR2 to drive the light source driving unit 14 and the light-emitting element 12 to be activated during the blanking period BP. In this way, it may be avoided that the blanking period BP of the electronic device 1 is too long, causing the light-off time to be too long, and causing the human eye to detect flicker.

As shown in FIG. 4, in some embodiments, the blanking period BP is divided into two time periods by the dummy period FTP of the dummy signal FTS. During the blanking period BP, the time length t3 of the period previous the dummy period FTP may be equal to the time length t4 after the dummy period FTP, but the present disclosure is not limited thereto. In other embodiments, the time length t3 may be greater than the time length t4, or the time length t3 may be less than the time length t4. In some embodiments, the time length t3 and the time length t4 may be less than the visual residual time length of the human eye. For example, the time length t3 and the time length t4 may both be less than, for example, 1.2 ms, 1.1 ms, 1 ms, 0.9 ms, 0.8 ms, 0.7 ms, 0.6 ms, 0.5 ms, or any value or any value range between the above values. Accordingly, the user may be prevented from noticing the flicker of the electronic device 1.

Figure 7:
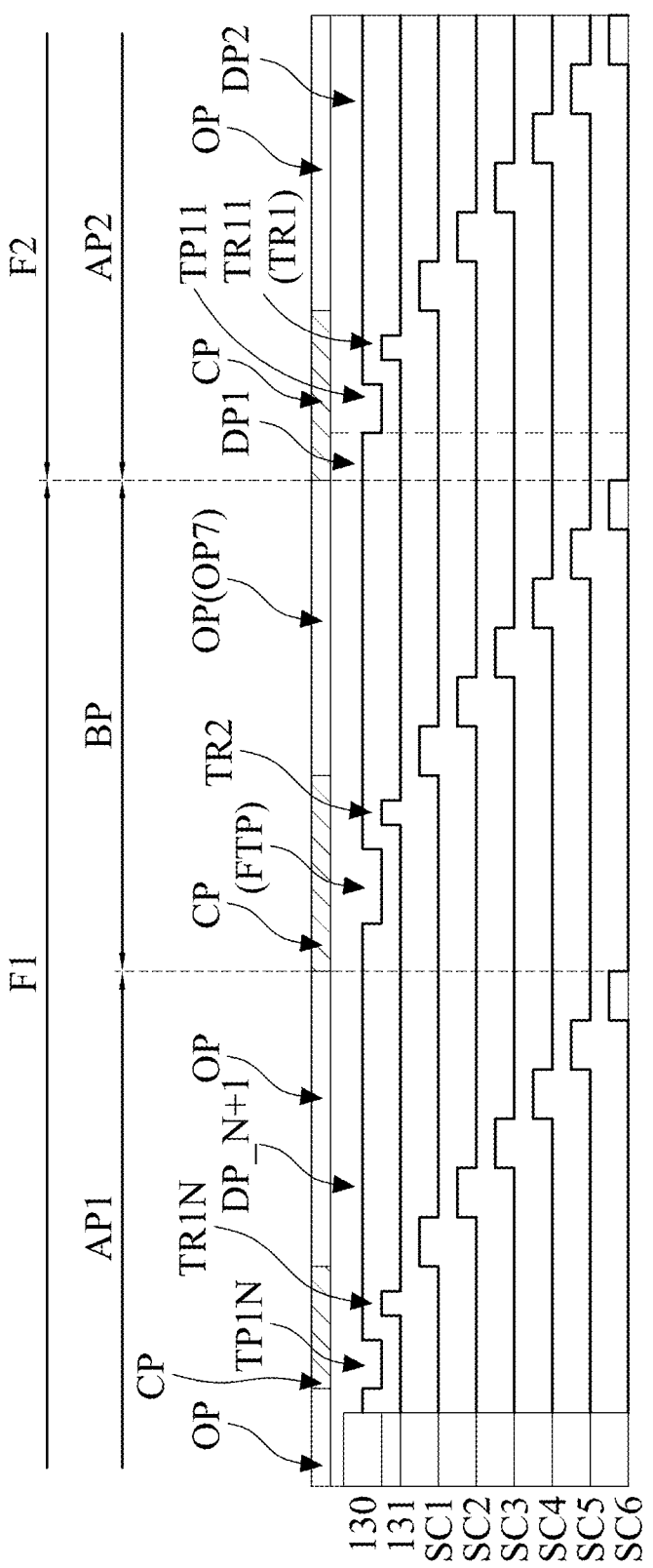
FIG. 7 is a timing diagram of the electronic device according to other embodiments of the present disclosure.

FIG. 7 is a timing diagram of the electronic device according to other embodiments of the present disclosure. Specifically, FIG. 7 is a timing diagram of the electronic device for sensing touch operations of a user's hand. As shown in the figure, the period in which the light-emitting element 12 is activated may be referred to as the light-on period OP, and the period in which the light-emitting element 12 is not activated may be referred to as the light-off period CP. During the blanking period BP, the touchscreen driving unit 130 may cause the bridge unit 131 to send the excitation signal TR2. Following the light source driving unit 14 receives the excitation signal TR2, the light source driving unit 14 may provide a scanning signal to drive the light-emitting element 12 to operate. For example, the first scanning signal SC1, the second scanning signal SC2, the third scanning signal SC3, the fourth scanning signal SC4, the fifth scanning signal SC5, and the sixth scanning signal SC6 are provided in sequence. In this way, an additional light-on period OP (marked as OP7) may be generated during the blanking period BP to solve the problem of excessively long light-off periods causing screen flickering.

Figure 8:
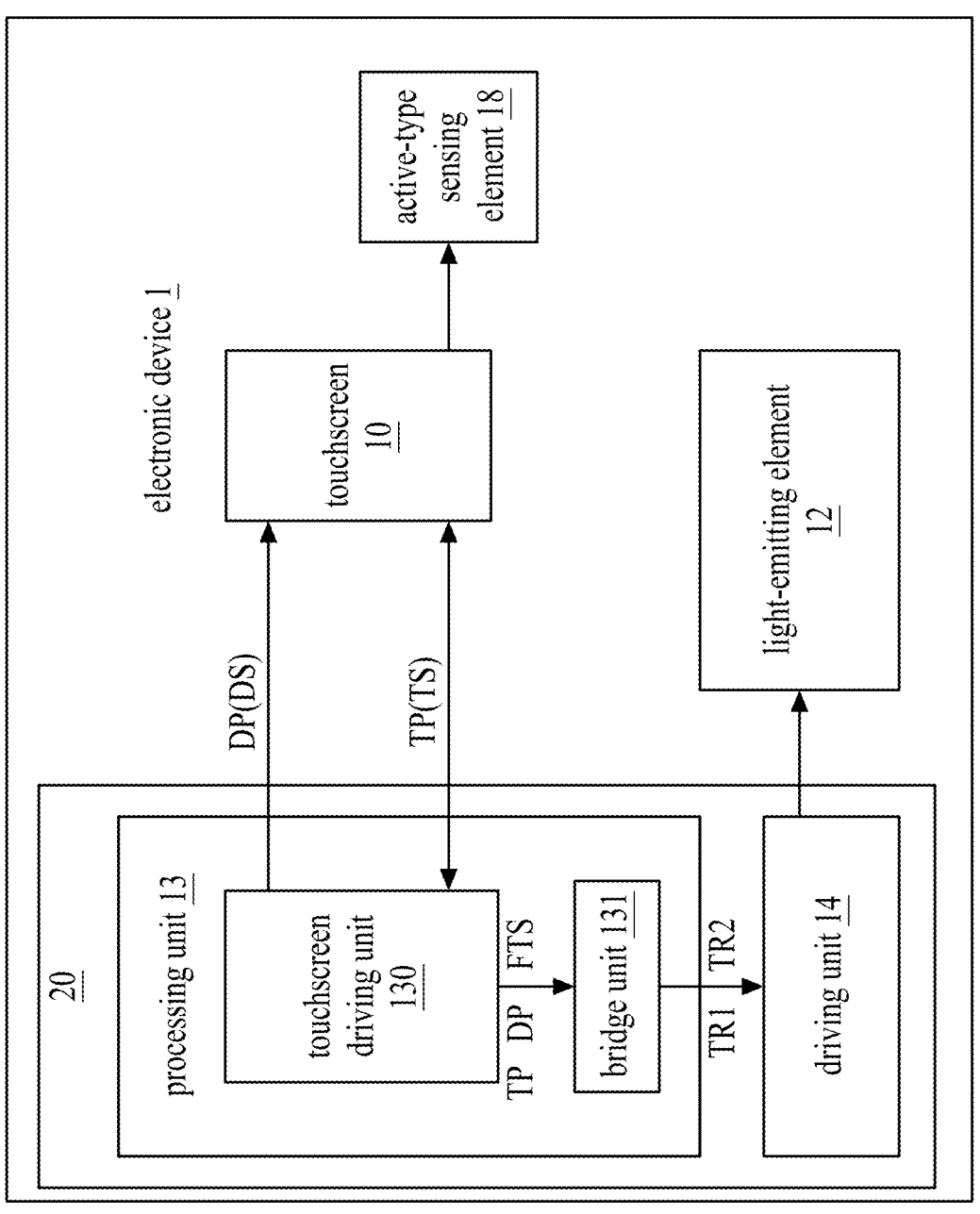
FIG. 8 is a block diagram of the electronic device according to further embodiments of the present disclosure.
Figure 9:
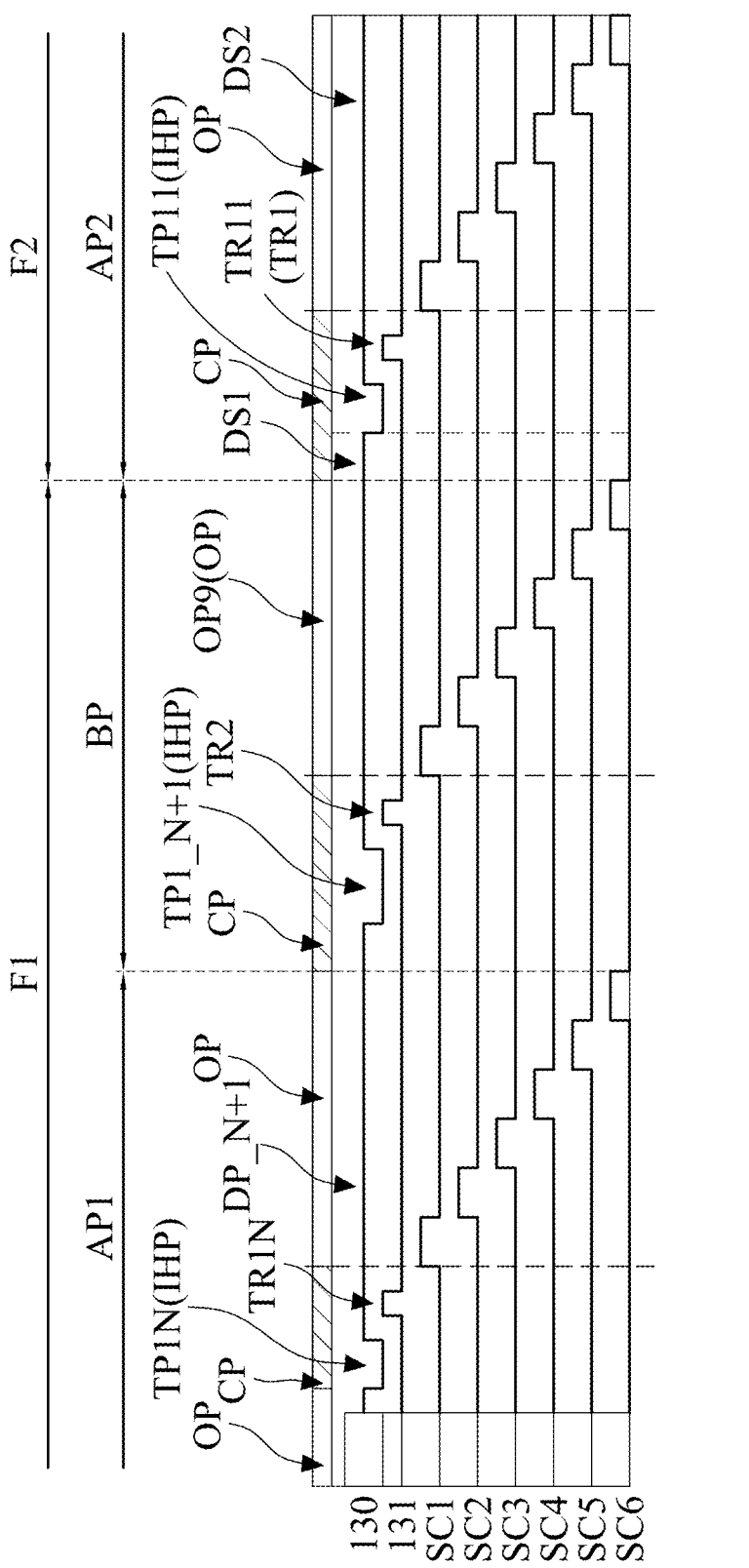
FIG. 9 is a timing diagram of the electronic device according to further embodiments of the present disclosure.

FIGS. 8 and 9 respectively are a block diagram and a timing diagram of the electronic device according to further embodiments of the present disclosure. Specifically, FIG. 9 is a timing diagram of the electronic device for sensing a touch operation of an active-type touch element. As shown in FIG. 8, the electronic device 1 includes a touchscreen 10, a light-emitting element 12, a processing unit 13, a light source driving unit 14, and an active-type sensing element 18, but the present disclosure is not limited thereto. The active-type sensing element 18 may be an active-type capacitive sensing element, such as a stylus. The active-type sensing element 18 may have a sensing chip. The touchscreen driving unit 130 sends an uplink signal, and the active-type sensing element 18 may send a downlink signal. The uplink signal and the downlink signal may exchange data at a fixed period. The uplink signal may be a touch signal. During the active period AP1, the uplink signal and the downlink signal may perform a handshake during the touch period TP (including the touch periods TP11, TP12 . . . and TP1N) as in the previous embodiment. For example, as shown in FIG. 9, during the active period AP1, the uplink signal and the downlink signal perform a handshake during the touch period TP1N, which is also marked as the handshake period IHP. During the blanking period BP, the uplink signal and the downlink signal also perform a handshake during the handshake period IHP. Any display period DP is not included within the blanking period BP. During the active period AP1, the bridge unit 131 may provide trigger signals (e.g., trigger signals TR1: TR11-TR1N) according to the information in the handshake period IHP, so that the light-emitting element 12 emits light. During the blanking period BP, the processing unit 13 is configured to cause the touchscreen driving unit 130 and the active-type sensing element 18 to perform a handshake during the handshake period IHP in the blanking period BP. Therefore, the bridge unit 131 may provide the excitation signal TR2 according to the information during the handshake period IHP, so that the light-emitting element 12 emits light. The light-emitting mode of the light-emitting element 12 may be scanning light-emitting. The description can be referred to above and is omitted here.

The difference from the embodiment shown in FIG. 7 is that in the embodiment shown in FIG. 9, during the blanking period BP, the bridge unit 131 generates the excitation signal TR2 through the information in the handshake period IHP. In FIG. 7, during the blanking period BP, the bridge unit 131 generates the excitation signal TR2 through the dummy signal FTS. In FIG. 9, the handshake period IHP in the blanking period BP is also a touch period. That is, during the handshake period IHP in the blanking period BP, the touchscreen driving unit 130 may send an uplink signal, and the uplink signal may be a touch signal.

In the embodiment shown in FIG. 9, during the blanking period BP, the uplink signal sent by the touchscreen driving unit 130 and the downlink signal sent by the active-type sensing element 18 handshake during the handshake period IHP, so that the bridge unit 131 sends the trigger signal TR2. Following the light source driving unit 14 receives the excitation signal TR2, the light source driving unit 14 may provide a scanning signal to trigger the light-emitting element 12. For example, the first scanning signal SC1, the second scanning signal SC2, the third scanning signal SC3, the fourth scanning signal SC4, the fifth scanning signal SC5, and the sixth scanning signal SC6 are provided in sequence. In this way, an additional light-on period OP (marked as OP9) may be generated during the blanking period BP to solve the problem of excessively long light-off periods causing screen flickering.

In the above, the electronic device, such as a touchscreen device, has been provided. To this end, the present disclosure further provides a display method for the electronic device, which may include the following steps. It should be noticed that some of the steps described below may be replaced or omitted, and the order of some of the steps described is interchangeable. Furthermore, it should be understood that some of the recited steps may be substituted or deleted for other embodiments of the method.

Step S10: An electronic device is provided, which includes a touchscreen 10 and a light-emitting element 12.

Step S12: The touchscreen 10 is caused to display a frame within the frame period F1, wherein the frame period F1 includes an active period AP1 and a blanking period BP, and the active period AP1 includes a plurality of display periods DP and a plurality of touch periods TP.

Step S14: During the active period AP1, a plurality of trigger signals TR1 (e.g., TR11-TR1N) are provided, and the light-emitting element 12 is caused to emit light according to the trigger signals TR1 (e.g., TR11-TR1N). In some embodiments, during the active period AP1, the light-emitting element 12 is caused to perform a first light-emitting scan 41 according to at least one of the plurality of trigger signals TR11-TR1N.

Step S16: During the blanking period BP, an excitation signal TR2 is provided, and the light-emitting element 12 is caused to emit light according to the excitation signal TR2. In some embodiments, before step S16, the dummy signal FTS may be provided during the blanking period BP, and the excitation signal TR2 may be provided according to the dummy signal FTS. In some embodiments, during the blanking period BP, the light-emitting element is caused to perform the second light-emitting scan 40B according to the excitation signal TR2.

Refer to the descriptions above for the details of each step and possible components. They are not repeated herein.

As mentioned above, the present disclosure provides an electronic device and a display method of the electronic device, which solves the problem by providing additional excitation signals during the blanking period of the frame period, so that the light-emitting element is additionally activated during the blanking period. There are some technical problems caused by insufficient brightness of the display screen or flickering of the screen.

In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the abovementioned process, machine, manufacturing, material composition, device, method, and steps. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
a touchscreen configured to display a frame within a frame period, wherein the frame period comprises an active period and a blanking period, and the active period comprises a plurality of display periods and a plurality of touch periods;
a processing unit electrically connected to the touchscreen, wherein the processing unit is configured to provide a plurality of trigger signals during the active period and to provide an excitation signal during the blanking period;
a light-emitting element overlapping the touchscreen; and
a light source driving unit electrically connected to the light-emitting element and the processing unit, wherein the light source driving unit is configured to cause the light-emitting element to emit light according to the plurality of trigger signals during the active period, and to cause the light-emitting element to emit light according to the excitation signal during the blanking period,
wherein the processing unit comprises a touchscreen driving unit configured to provide a touch signal in at least one of the plurality of touch periods,
wherein the processing unit comprises a bridge unit, wherein during the active period, the touchscreen driving unit is configured to transmit touch information of the plurality of touch periods to the bridge unit, and the bridge unit is configured to provide the plurality of trigger signals according to the touch information,
wherein during the blanking period, the touchscreen driving unit is configured to provide a dummy signal, and the bridge unit is configured to provide the excitation signal according to the dummy signal.

2. The electronic device as claimed in claim 1, wherein the plurality of touch periods comprise a first touch period, the plurality of trigger signals comprise a first trigger signal, a period of the first trigger signal follows the first touch period, and the period of the first trigger signal is adjacent to the first touch period.

3. The electronic device as claimed in claim 1, wherein a period of the excitation signal follows a period of the dummy signal, and the period of the excitation signal is adjacent to the period of the dummy signal.

4. The electronic device as claimed in claim 2, wherein during the active period, the light source driving unit is configured to cause the light-emitting element to perform a first light-emitting scan following the period of the first trigger signal.

5. The electronic device as claimed in claim 4, wherein during the blanking period, the light source driving unit is configured to cause the light-emitting element to perform a second light-emitting scan following the excitation signal.

6. The electronic device as claimed in claim 4, wherein the plurality of touch periods comprise a second touch period, and a period of the first light-emitting scan is between the period of the first trigger signal and the second touch period.

7. The electronic device as claimed in claim 1, further comprising an active-type sensing element, wherein the processing unit is configured to cause the touchscreen driving unit to perform a handshake with the active-type sensing element during a handshake period in the blanking period.

8. The electronic device as claimed in claim 1, wherein the touchscreen comprises a first substrate, a second substrate, and a display layer, and the display layer is disposed between the first substrate and the second substrate.

9. The electronic device as claimed in claim 8, wherein the display layer comprises a plurality of pixels, a data driving unit, a gate driving unit, a data line, a gate line, and an electrode.

10. The electronic device as claimed in claim 1, wherein the light-emitting element is a scan-type light-emitting element.

11. The electronic device as claimed in claim 10, wherein the light-emitting element comprises a plurality of light-emitting units, and the light-emitting units is divided into M groups of light-emitting units, wherein M is an integer between 2 and 128.

12. The electronic device as claimed in claim 11, wherein the light-emitting units in each group is connected to the same positive electrode through the same scanning signal line, but the light-emitting units in each group is connected to a different negative electrode through a different channel signal line.

13. A display method, comprising:

providing an electronic device, wherein the electronic device comprises a touchscreen and a light-emitting element;

causing the touchscreen to display a frame within a frame period, wherein the frame period comprises an active period and a blanking period, and the active period comprises a plurality of display periods and a plurality of touch periods;

providing a plurality of trigger signals and causing the light-emitting element to emit light according to the plurality of trigger signals during the active period;

providing a dummy signal during the blanking period; and providing an excitation signal according to the dummy signal and causing the light-emitting element to emit light according to the excitation signal during the blanking period.

14. The display method as claimed in claim 13, further comprising: during the active period, causing the light-emitting element to perform a first light-emitting scan according to at least one of the plurality of trigger signals.

15. The display method as claimed in claim 13, further comprising: during the blanking period, causing the light-emitting element to perform a second light-emitting scan according to the excitation signal.

\* \* \* \* \*